US010021745B2

(12) United States Patent
Kong et al.

(10) Patent No.: US 10,021,745 B2
(45) Date of Patent: Jul. 10, 2018

(54) LED DIMMING WITH SLOW DATA CHANNEL TRANSMISSION

(71) Applicants: DIALOG SEMICONDUCTOR INC., Campbell, CA (US); DIALOG SEMICONDUCTOR (UK) LIMITED, London (GB)

(72) Inventors: Lingxin Kong, Beijing (CN); Nailong Wang, Beijing (CN); Guanou Yang, Beijing (CN); Benny Hou, Shanghai (CN); Yimin Chen, Campbell, CA (US); Jianming Yao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/824,873

(22) Filed: Nov. 28, 2017

(65) Prior Publication Data

US 2018/0084615 A1 Mar. 22, 2018

Related U.S. Application Data

(63) Continuation of application No. PCT/CN2016/076431, filed on Mar. 15, 2016.

(51) Int. Cl.
*H05B 33/08* (2006.01)
*H05B 37/02* (2006.01)
*H02M 1/00* (2006.01)

(52) U.S. Cl.
CPC ..... *H05B 33/0815* (2013.01); *H05B 33/0845* (2013.01); *H05B 33/0851* (2013.01); *H02M 2001/007* (2013.01); *H05B 37/0272* (2013.01)

(58) Field of Classification Search
None
See application file for complete search history.

(56) References Cited

U.S. PATENT DOCUMENTS

| 8,466,631 B1 | 6/2013 | Rhodes et al. | |
| 2008/0191685 A1* | 8/2008 | Dhuyvetter | H03K 7/08 324/118 |
| 2008/0192509 A1* | 8/2008 | Dhuyvetter | H02M 3/33523 363/17 |
| 2011/0031899 A1 | 2/2011 | Chu et al. | |
| 2013/0169182 A1* | 7/2013 | Park | H02M 3/33507 315/219 |
| 2013/0271040 A1* | 10/2013 | Chen | H05B 33/0815 315/307 |
| 2014/0078789 A1* | 3/2014 | Li | H02M 3/33507 363/21.15 |
| 2014/0354170 A1 | 12/2014 | Gredler et al. | |
| 2015/0264758 A1 | 9/2015 | McDougle | |

FOREIGN PATENT DOCUMENTS

CN 101835317 A 9/2010

OTHER PUBLICATIONS

PCT Search Report and Written Opinion dated Dec. 20, 2016 from corresponding International Application No. PCT/CN2016/076431 filed Mar. 15, 2016.

* cited by examiner

*Primary Examiner* — Jany Richardson
(74) *Attorney, Agent, or Firm* — Haynes and Boone, LLP

(57) ABSTRACT

An data transmission method is provided for transmitting analog data through an isolating device using a calibration input pulse and a data input pulse. The analog data may represent, for example, the desired dimming value for a flyback converter powering a solid state lighting system.

17 Claims, 4 Drawing Sheets

LED DIMMING WITH SLOW DATA CHANNEL TRANSMISSION

CROSS-REFERENCE TO RELATED APPLICATIONS

This application is a continuation of International Application No. PCT/CN2016/076431 filed Mar. 15, 2016, which is hereby incorporated by reference in its entirety.

TECHNICAL FIELD

This application relates to switching power supplies, and more particularly to data transmission for a switching power supply through an isolating device such as an optocoupler or an isolating transformer.

BACKGROUND

Switching power converters offer higher efficiency as compared to linear regulators. Although linear regulators are relatively inexpensive, they regulate a lower output voltage from a higher input voltage by simply burning the difference as heat. As a result, a linear regulator typically burns more power than is actually supplied to the load. In contrast, a switching power converter regulates its output voltage by delivering relatively small increments of energy through the cycling of a power switch. The power switch in a switch-mode device is either off or on such that efficiency is markedly improved as compared to linear regulators.

Given their high efficiency, a switching power converter such as a flyback converter are typically used as the power supply for solid state lighting applications. A flyback converter includes a transformer having a primary winding and a secondary winding. A rectified AC voltage powers the primary winding when a primary-side controller cycles the power switch on. The resulting current through the primary winding develops a magnetic field that stores energy. This stored energy is released when the power switch cycles off, resulting in a pulse of secondary current. The secondary current powers the solid state lighting bulb (a light emitting diode (LED)).

Although flyback converters have high efficiency, their integration in solid state lighting applications may be complicated if the user retains traditional triac-based dimming switches. As the user adjusts the dimming level to full output, the triac within the dimming switch passes the full AC cycle from the AC mains to the rectifier that produces the rectified AC voltage for driving the primary winding. But at reduced dimming levels, the triac switch cuts out part of the AC cycle depending upon whether the triac switch is in a leading edge or trailing edge dimming configuration. The greater efficiency of LED bulbs as compared to incandescent bulbs often results in the solid state lighting application not drawing enough current through the triac switch at higher dimming setting such that the triac resets. The LED bulb may then flicker.

To eliminate flicker, triac switches are being phased out in modern solid-state lighting applications. For example, a user may control a voltage or current on the secondary side of the flyback converter through a non-triac-based dimming switch. The dimming setting must then be communicated to the primary-side controller of the power switch so that the appropriate power setting (e.g., a pulse-width-modulation or pulse-frequency-modulation setting) for the power switch may be applied to effect the desired dimming level. But a direct electrical signal such as through coupling a wire or lead from the secondary side to the primary side for communicating the desired dimming level or setting destroys the desired isolation between the primary and secondary windings. To maintain this isolation, the dimming command may be communicated through an isolating device such as an optocoupler or an isolating transformer. For example, the dimming switch may drive a pulse through the optocoupler such as used in conventional binary signaling of a logical one or zero bit value. But optocouplers may have pronounced non-linearity with regard to their rise and fall times due to their current transfer ratios that vary from device to device and also with temperature. As shown in FIG. 1, an input pulse train 100 transmitted through an optocoupler will thus result in a delayed output pulse train 105 having slow rise and fall times. A receiver that compares output pulse train 105 to a threshold voltage 110 produces a received pulse train 115 that is markedly distorted compared to input pulse train 100. In order to reliably produce binary one and binary zero values in the received pulse train 115, the data rate for the input pulse train 100 must be sufficiently slow. If the data rate is increased, a pulse width for input pulse train 100 may be too narrow to result in a crossing of threshold voltage 110. But as the data rate is slowed, the user may over compensate for the slow response of the dimming switch such that the user begins to oscillate the dimming switch, resulting in user frustration.

Accordingly, there is a need in the art for improved signaling techniques through isolating devices such as an optocoupler.

SUMMARY

An isolating device such as an optocoupler has wide variation from device to device and also over temperature with regard to the delay provided to the rising edges (represented herein by the variable $\delta r$) of transmitted pulses and also to the falling edges (represented herein by the variable $\delta f$) of the transmitted pulses. This variable delay inhibits the data rate for digital signaling techniques. To overcome these difficulties, a dimming switch drives a pair of input pulses through the isolating device responsive to a desired dimming level to produce a pair of output pulses from which a primary side controller in a flyback converter for a solid state lighting application may derive an analog value representing the desired dimming level. The isolating device delays a rising edge for each input pulse by a delay rise time and delays a falling edge for each pulse by a delay fall time. The pair of input pulses may be deemed to comprise a data input pulse and a calibration input pulse. The data input pulse passes through the isolating device to form a received data pulse that has a pulse width equaling the pulse width of the data input pulse minus $\delta r$ and plus $\delta f$. Similarly, the calibration input pulse passes through the isolating device to forma a received calibration pulse having a pulse width equaling the pulse width of the calibration input pulse minus $\delta r$ and plus $\delta f$.

The data input pulse occurs over a data period. Similarly, the calibration occurs over a calibration period. The dimming switch encodes the desired dimming level into one of a pulse width, the data period, or a duty cycle for the data input pulse. By comparing the received data pulse to the received calibration pulse, the primary side controller recovers the encoded desired dimming level. The primary side controller may thus recover the desired analog value quickly and adjust the cycling of the power switch to effect the

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
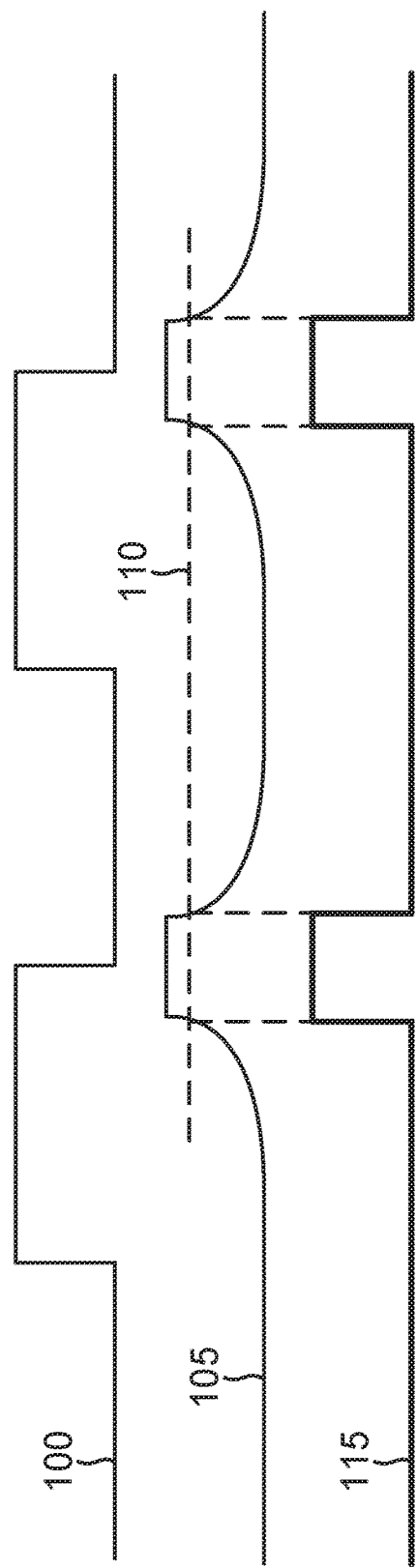
FIG. 1 illustrates the waveforms for an input pulse train to an isolating device and a resulting output pulse train from the isolating device.

A technique for data transmission through an isolating device such an optocoupler or an isolating transformer is provided that transmits an analog value. The following discussion will be directed to the application of this technique for communicating a desired dimming value for a flyback converter driving a LED bulb (or bulbs). But it will be appreciated that the data transmission technique may be used in any application that communicates an analog value through an isolating device having variable and relatively slow rise and fall times with regard to the transmission of rising and falling edges, respectively, of input pulses. The following discussion will assume that the isolating device is an optocoupler. An optocoupler will also be referred to herein as a optoisolator such that the terms are used interchangeably. However, it will be appreciated that an isolating transformer may also be used to form the isolating device.

To transmit the analog value, a modulator drives a data input pulse and a calibration input pulse through the optocoupler. The calibration input pulse has a pulse width denoted as t1 defined over a calibration period denoted as T1. Similarly, the data input pulse has a pulse width denoted as t2 defined over a data period denoted as T2. The calibration input pulse passes through the optocoupler to form a received calibration pulse having a pulse width denoted as t1' that is distorted by the variable rise time δr and the variable fall time δf of the isolating device. In particular, t1 equals (t2−δr+δf). Similarly, the data input pulse passes through the optocoupler to form a received data pulse having a pulse width denoted as t2' that equals (t2−δr +δf). The primary side controller processes the received calibration and data pulses to eliminate the unknown variable rise and fall delays δr+δf so as to recover the encoded desired dimming level. Since rising edges for the received pulses are delayed by the same rise delay time of δr (and the falling edges are delayed by the same fall delay time δf), the periods from the input pulses are unchanged in the received pulses. The period for the received calibration pulse is thus T1 whereas the period for the received data pulse is T2.

The processing of the received data and calibration pulses to recover the encoded dimming value depends upon the encoding used by the modulator driving the optocoupler. This encoding has two main embodiments. In a different-periods embodiment, the data period T2 differs from the calibration period T1. The encoding may proceed several ways in the first main embodiment. For example, the modulator may drive the calibration input pulse and the data input pulse with a duty cycle D that represents or is proportional to the desired dimming level. The calibration input pulse then has a pulse width of D*T1. The pulse width t1' for the received calibration pulse then becomes D*T1−Δt, where Δt equals (δr - δf). Similarly, the data input pulse will then have a pulse width of D*T2 that translates into a pulse width t2' for the received calibration pulse that equals D*T2−Δt. By forming the ratio (t1'−t2')/(T2−T1), the primary side controller thus recovers the duty cycle D and drives the power switch accordingly to achieve the desired dimming level.

In another implementation of the different-periods embodiment, the desired dimming level is encoded by a difference (T2−T1) between the data and calibration periods. Since such a value does not scale readily to a desired dimming level (which ranges from 0% to 100%), the dimming level may thus be encoded by the ratio of (T2−T1)/T1 or by the ratio (T2−T1/T2. In general, both the pulse widths and the pulse off times may be differ from each other in such an embodiment. But there are two special cases for the difference (T2−T1). In a first special case, the pulse widths for the calibration and data input pulses equal each other such that both pulses widths equal tl. In that case, the received pulses widths are both t1'. The off time for the received calibration pulse may be denoted as t1off such that T1 equals (t1'+t1off). Similarly, the off time for the received data pulse may be denoted as t2off such that T2 equals (t1'+t2off). The difference (T2−T1) then devolves into the difference between the received off times (t2off−t1off). If the pulse widths are the same, the primary controller may thus form the difference (T2−T1) through the difference (t2off−t1off). Similarly, the off times for the calibration and data input pulses may equal each other. In that case, T2 equals (t2'+t1off). The difference between the periods (T2−T1) then devolves into the difference between the received pulse widths (t2'−t1').

In a second main embodiment, the pulse widths T1 and T2 are equal. The second main embodiment may thus be denoted as a constant-period embodiment. The calibration input pulse has a duty cycle denoted as Dcal. A duty cycle D for the data input pulse equals or is proportional to the desired dimming value. The pulse width t1' for the received calibration pulse is thus T1*Dcal−Δt. The pulse width t2' for the received data pulse then equals T1*D−Δt. The duty cycle D thus equals (t2'−t1')/T+Dcal. The ratio (t2'−t1')/T may be deemed to form a comparison result that is adjusted by the calibration duty cycle Dcal. If the primary side controller is configured with the calibration duty cycle Dcal, it may thus recover the duty cycle D so as to recover the desired dimming level.

Figure 2:
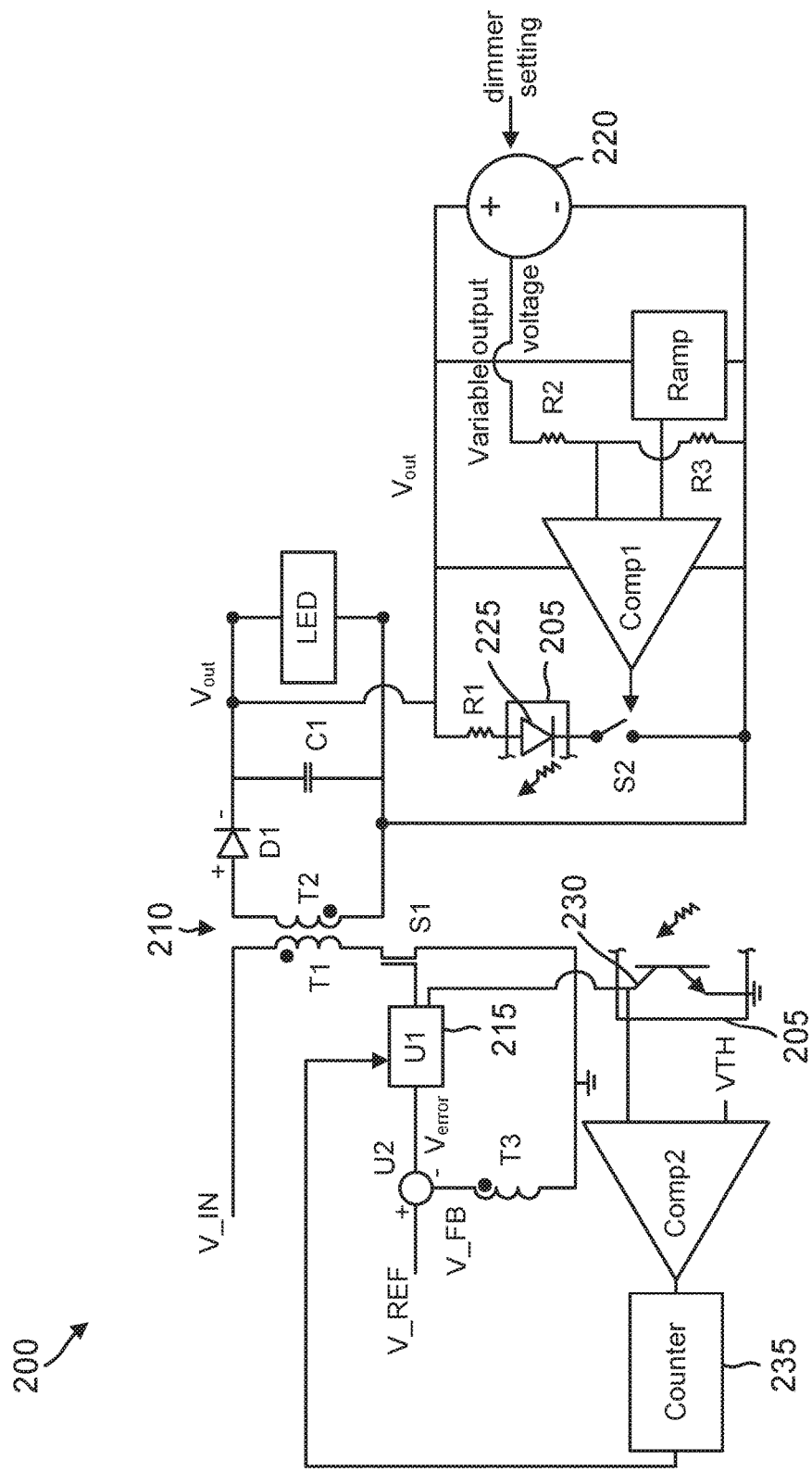
FIG. 2 is a diagram of an example flyback converter configured for slow channel data transmission in accordance with an aspect of the disclosure.

An example flyback converter 200 configured for the data transmission technique of communicating a desired dimming level as an analog value through an optocoupler 205 is shown in FIG. 2. In flyback converter 200, a rectified input voltage V_IN drives a magnetizing current into a first terminal of a primary winding T1 of a transformer 210 when a primary controller 215 (U1) cycles on a power switch such as an NMOS power switch transistor S1. The source of power switch transistor S1 couples to ground whereas its drain couples to a remaining second terminal of primary winding T1. The resulting magnetic energy buildup in transformer 210 is released upon the opening of power switch transistor S1 so as to induce a current in a second winding T2 of transformer 210, forward bias an output diode D1, and charge a filter capacitor C1 providing an output voltage Vout across an LED load. Controller 215 receives an error voltage Verror that is representative of the difference between the output voltage Vout and a desired value for the output voltage to control the cycling of power switch S1 so as to regulate the output voltage at the desired value. For example, transformer 210 may include an auxiliary winding T3 from which the feedback voltage V_FB is derived as known in the primary-only feedback arts. A differential amplifier U2 determines the difference between the feedback voltage V_FB and a reference voltage (V_REF) to form the error voltage Verror. Alternatively, controller 215 may receive the feedback voltage through optoisolator 205. Based on the difference between the output voltage Vout and the desired value, controller 215 regulates the output voltage Vout using a suitable control algorithm such as a proportional-integral (PI) or a proportional-integral-derivative (PID) as known in the switching power converter arts.

Regardless of the particular control algorithm implemented by controller 215, it will determine a desired switch on time (pulse width) or pulse frequency accordingly. Controller 215 is configured to alter this regulation responsive to an analog value representing the desired dimming value as communicated through optoisolator 205. For example, a user may set the desired dimming value through an analog switch (not illustrated). A variable voltage source 220 powered by the output voltage Vout (or by a power supply voltage derived from the output voltage Vout) responds to the desired dimmer value by adjusting its own variable output voltage accordingly. This variable output voltage is divided in a voltage divider formed by a serial combination of a resistor R2 and R3 to form an input voltage to a first comparator (Comp1). A ramp generator drives another input to the first comparator. Based upon the difference between the ramp generator output and the divided voltage from the voltage divider, the first comparator will either close or open a switch S2 (for example, an NMOS transistor switch) that controls a current through an light-emitting diode such as an infrared diode 225 in optoisolator 205. A resistor R1 couples infrared diode 225 to the power rail providing the output voltage Vout (or to a power supply voltage derived from Vout). When the first comparator closes switch S2, infrared diode 225 will emit infrared light that induces a current in a phototransistor 230 in optoisolator 205. The first comparator as driven by the variable voltage source and the ramp generator thus forms a modulator for driving the calibration and data input pulses into optoisolator 205.

At the primary side, flyback converter 200 includes a second comparator (Comp2) that compares a resulting terminal voltage for phototransistor 230 to a threshold voltage VTH. Depending upon whether the terminal voltage is greater or less than the threshold voltage, an output voltage for the second comparator will be either a binary one (high value) or a binary zero (low value). A detector such as a counter 235 detects the pulse widths and off times durations for the received calibration and data pulses generated by the second comparator. As discussed above, the pulse width for the received calibration pulse is denoted herein as t1'. This pulse width may be represented by the corresponding count from counter 235 over which the output of the second comparator was high for the received calibration pulse. When the second comparator output signal then goes low, counter 235 forms a count that represents the off time for the received calibration pulse t1off'. Similar counts may be formed to represent the pulse width t2' and the off time t2off' for the received data pulse. Alternatively, the detector may comprise an integrator that outputs a voltage representing an integration of the high or low durations for the output of the second comparator to represent the pulse widths and off time for the received calibration and data pulses. Controller 215 is configured to compare the counts from counter 235 to recover the desired dimming setting. Alternatively, another logic circuit may perform the recovery of the desired dimming setting from the received pulses.

The comparison of the count depends upon the pulse parameters set by the ramp generator. For example, the ramp generator may be configured to generate two ramps of different periods. The duty cycle for each pulse in the output of the first comparator will then depend upon the divided voltage from the voltage divider. In turn, the divided voltage depends on the desired dimming setting. By recovering the duty cycle using the counts of the high and low times for the output of the second comparator, controller 215 receives the desired dimming value through optoisolator 205 using just two consecutive pulses. This is quite advantageous as compared to transmitting a digitized value of the dimmer setting using a greater number of pulses (and hence greater delay). As discussed previously, the problem with digital signaling through optocoupler 205 is that its current transfer ratio will alter the pulse width of pulses transmitted through it. For example, suppose the first comparator pulses a current through infrared diode 225 for an on-time of t1. Without any distortion, one would expect the resulting pulse width in the output of the second comparator to also have a duration of t1. But the current transfer ratio of optoisolator 205 will instead result in a pulse width of (t1−δr+δf). As discussed previously, δr is the unknown delay that optocoupler 205 induces between a rising edge for the first comparator output signal as compared to the corresponding rising edge for the output signal of the second comparator. Similarly, δf is the unknown delay that optocoupler 205 induces between a falling edge for the output signal of the first comparator as compared to the corresponding falling edge for the second comparator output signal.

Note that a period between one rising edge and another for the first comparator output signal will translate into the same period for the second comparator output signal. For example, if a first rising edge occurs at a time t1 for the first comparator output signal, the corresponding rising edge occurs in the second comparator output signal at time t1−δr. Similarly, if the second rising edge occurs at a time t2 for the first comparator output signal, the corresponding rising edge occurs in the second comparator output signal at a time t2−δr. The period between the two input rising edges is thus t2−t1. But the period between the two output rising edges is also t2−t1 since the variables δr cancel. But this is not the case for either the on time (pulse width) or off time for a given pulse cycle transmitted through optoisolator 205. As noted earlier, an input on time of t1 distorts to an output on time of (t1−δr+δf). Similarly, an input off time of t1 distorts to a output off time of (t1+δr−δf).

Figure 3:
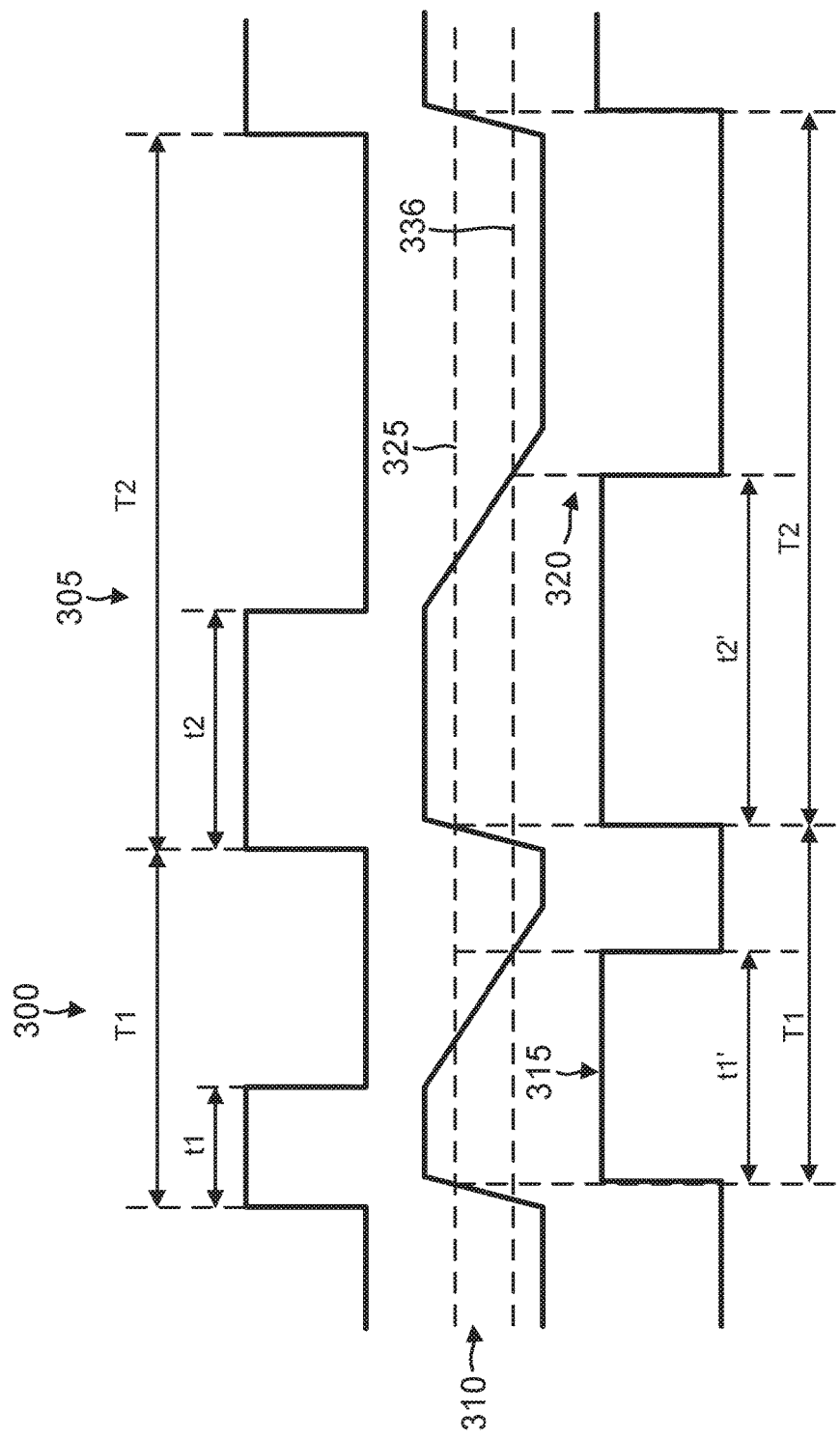
FIG. 3 illustrates the waveforms for a calibration input pulse and a data input pulse having different periods but the same duty cycle and also the resulting phototransistor output voltage waveforms as well as the resulting waveforms for the received calibration and data pulses in accordance with an aspect of the disclosure.

This distortion in the on and off times for a given pulse cycle prevents flyback converter 200 from transmitting the desired dimming setting as merely the duty cycle for one pulse. For example, suppose the input pulse width time is represented by t1 and the input pulse period is denoted as T1. The transmitted duty cycle is thus t1/T1. Although the same period T1 will be received through optoisolator 205, the resulting duty cycle for the output signal of the second comparator is (t1−δr+δf)/T1. But the data transmission techniques disclosed herein eliminates the unknown variables δr and δf. As noted above there are two main embodiments: a different-periods embodiment and a constant-period embodiment. For example, the calibration input pulse and the data input pulse may each be transmitted having identical duty cycles (as set through the desired dimming value) but having different periods. These two different periods may are represented by the values T1 and T2 for a calibration input pulse 300 and a data input pulse 305, respectively as shown in FIG. 3. The pulse width for calibration input pulse period 300 is represented by the variable t1 whereas the on time (pulse width) for the data input pulse 305 is represented by the variable t2. The resulting terminal voltage on phototransistor 230 that is received by the second comparator is represented by a distorted pulse train 310. In this embodiment, the second comparator introduces hysteresis such that a received calibration pulse 315 and a received data pulse 320 formed by the second comparator output signal are both a binary high when the corresponding pulses for distorted pulse train 305 are above a high threshold 325 and such that received calibration pulse 315 received data pulse 320 are both a binary low when the corresponding pulses in distorted pulse train 305 are below a low threshold 336. As discussed previously, the pulse periods transmit through optocoupler 205 without any distortion. Received calibration pulse 315 thus preserves period T1. Similarly, received data pulse 320 preserves period T2. But the pulse width for received calibration pulse 315 is represented by a variable t1' that equals t1−Δt as discussed previously. Similarly, the pulse width for received data pulse 320 is represented by a variable t2' that equals t2−Δt. By forming the ratio (t2'−t1')/(T2−T1), controller 215 thus recovers the duty cycle D and drives the power switch S1 accordingly to achieve the desired dimming level.

The pulse period difference (T2−T1) may be detected through the high counts and low counts in counter 235. Note that the designations of "data" and "calibration" pulses in such an embodiment are arbitrary since both input pulses have the same duty cycle D. Pulse 305 may thus be deemed to form the calibration input pulse. Similarly, pulse 300 may be deemed to form the data input pulse. Regardless of which pulse is which, a count formed during the pulse width may be designated as a high count whereas a count formed during the pulse's off time may be designated as a count. A first consecutive series of high and low counts represents one period and the second consecutive series of high and low counts represents the remaining period. The difference (t2'−t1') is thus represented by the difference between the high counts.

Figure 4:
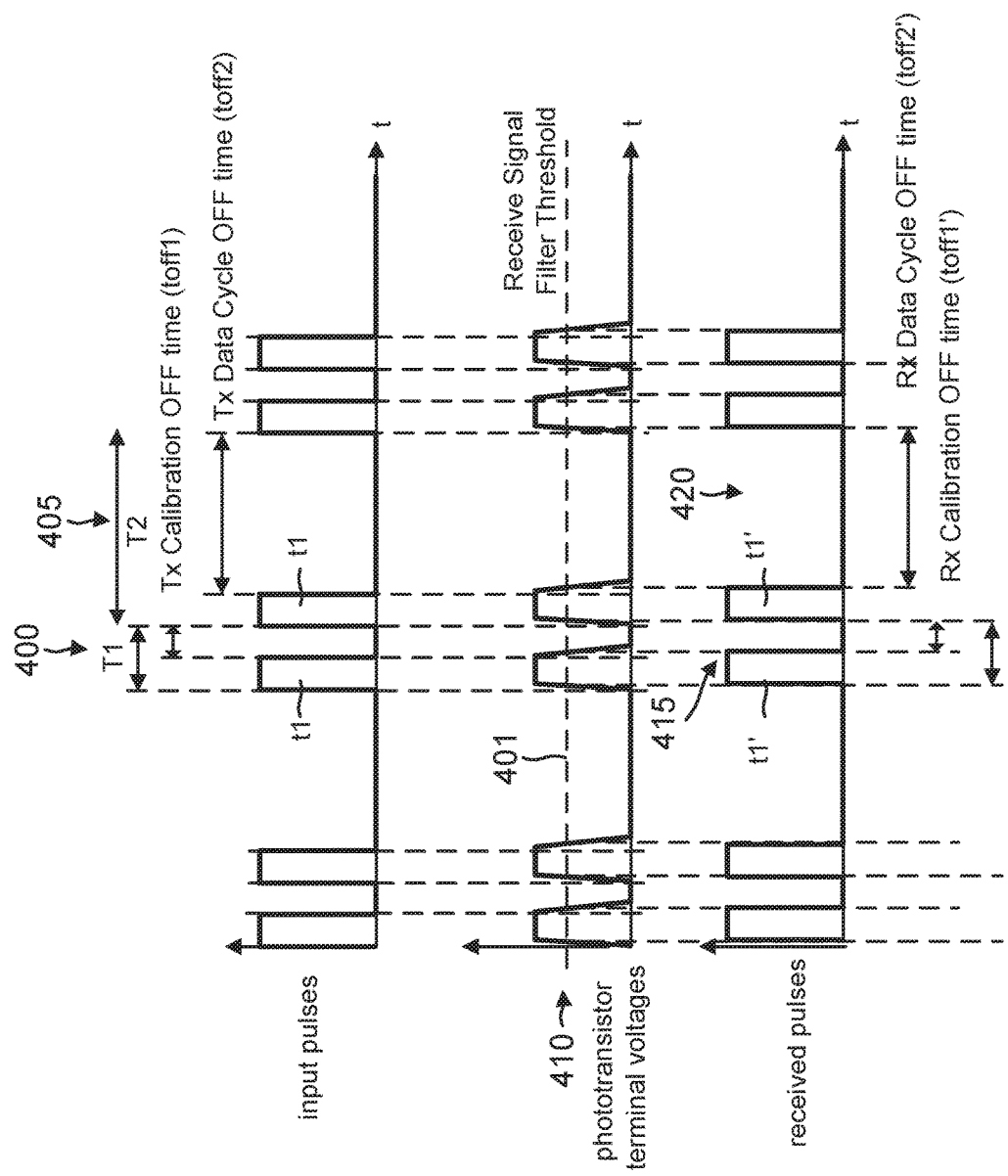
FIG. 4 illustrates the waveforms for calibration input pulse and a data input pulse having the same periods but different duty cycles and also the resulting phototransistor output voltage waveforms as well as the resulting waveforms for the received calibration and data pulses in accordance with an aspect of the disclosure.

The corresponding waveforms for a different-periods embodiment with constant pulse widths is shown in FIG. 4. A calibration input pulse 400 and a data input pulse 405 both have a pulse width of t1. Calibration input pulse 400 has an off time of t0ff1 whereas data input pulse 405 has an off time of toff2. The resulting phototransistor terminal voltage waveform 410 is compared to a threshold voltage 401 (a no hysteresis comparison) to produce a corresponding received calibration pulse 415 having a period of T1 and a received data pulse 420 having a period of T2. Each of these received pulses has a pulse width of t1'. As discussed above, the desired dimming level may be encoded through either the ratio (T2−T1)/T1 or (T2−T1)/T2. The difference (T2−T1) devolves into the difference between the received off times (toff2'−toff1'). Controller 215 may thus determine this difference through a difference of the corresponding low counts.

As discussed above, controller 215 would need extra information such as the calibration duty cycle in a constant-period embodiment. This additional information may be stored in a non-volatile memory such as a fuse memory (not illustrated).

Those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A data transmission method for an isolating device, comprising;
    adjusting one of a pulse period, a pulse width, and an off time for a data input pulse responsive to a desired analog value;
    driving the data input pulse and a calibration input pulse through the isolating device to produce an output signal;
    comparing the output signal to a threshold to generate a received calibration pulse resulting from the transmission of the calibration input pulse through the isolating device and to generate a received data pulse resulting from the transmission of the data input pulse through the isolating device, wherein a pulse width for the received data pulse equals the pulse width for the data input pulse minus a time difference resulting from a rising edge delay and a falling edge delay for the isolating device;
    recovering the desired analog value without any distortion resulting from a rising edge delay and a falling edge delay for the isolating device by comparing the received data pulse to the received calibration pulse.

2. The data transmission method of claim 1, wherein the isolating device comprises an optocoupler.

3. The data transmission method of claim 2, wherein the optocoupler is within a flyback converter, and wherein the desired analog value is a desired dimming value for a solid state lighting system powered by the flyback converter.

4. The data transmission method of claim 3, further comprising adjusting a cycling of a power switch in the flyback converter to effect the desired dimming value.

5. The data transmission method of claim 3, wherein adjusting the data input pulse comprises adjusting the duty cycle of the data input pulse to a first value to represent the desired dimming value, and wherein a duty cycle for the calibration pulse equals the first value, and wherein driving the calibration input pulse through the optocoupler comprises driving the calibration input pulse over a first period and wherein driving the data input pulse through the optocoupler comprises driving the data input pulse over a second period that is greater than the first period.

6. The data transmission method of claim 5, wherein recovering the desired dimming value comprises determining a first difference between a pulse width for the received data pulse and a pulse width for the received calibration pulse, and determining a second difference between the second period and the first period, and forming a ratio of the first difference and the second difference.

7. The data transmission of claim 5, wherein recovering the desired dimming value comprises determining a difference between the second period and the first period and dividing the difference by either the first period or the second period.

8. The data transmission method of claim 3, wherein the calibration input pulse has a calibration duty cycle and wherein the duty cycle of the data input pulse represents the desired dimming value, and wherein a period for the calibration input pulse equals a period for the data input pulse, and wherein recovering the desired dimming value comprises forming a comparison result from the comparison of the received data pulse and the received comparison pulse and adding the calibration duty cycle to the comparison result.

9. The data transmission method of claim 3 wherein adding the calibration duty cycle to the comparison result further comprises retrieving the calibration duty cycle from a non-volatile memory.

10. A flyback converter, comprising:
an isolating device;
a modulator configured to drive a calibration input pulse and a data input pulse into the isolating device;
a receiver coupled to an output terminal device to detect a received calibration pulse resulting from the calibration input pulse and to detect a received data pulse resulting from the data input pulse;
a power switch coupled to a primary winding of a transformer; and
a controller configured to cycle the power switch on and off to regulate an output voltage at a secondary winding of transformer, wherein the controller is further configured to compare the received calibration pulse to the received data pulse to recover an desired dimming value encoded by the data input pulse, and wherein the controller is further configured to adjust the cycling of the power switch responsive to the recovered desired dimming value.

11. The flyback converter of claim 10, wherein the isolating device comprises an optocoupler.

12. The flyback converter of claim 10, wherein the isolating device comprises an isolating transformer.

13. The flyback converter of claim 11, wherein the modulator comprises:
a first comparator;
a variable voltage source configured to provide a variable output voltage responsive to the desired dimming value; and
a ramp generator, wherein the first comparator is configured to compare the variable output voltage to a ramp signal from the ramp generator to drive a switch within the optocoupler to drive the calibration input pulse and the data input pulse through the optocoupler.

14. The flyback converter of claim 13, wherein the ramp generator is configured to generate the ramp signal so as to alternate between a first period and a second period for the ramp signal, and wherein the second period is greater than the first period.

15. The flyback converter of claim 14, wherein the second period is a period for the data input pulse and wherein the first period is a period for the calibration input pulse.

16. The flyback converter of claim 13, wherein the receiver comprises a second comparator configured to compare a terminal voltage for a phototransistor in the optocoupler to a threshold voltage to produce the received calibration pulse and the received data pulse.

17. The flyback converter of claim 16, further comprising a counter configured to count a high count while an output signal from the second comparator has a binary one value and to count a low count while the output signal from the second comparator has a binary zero value.

* * * * *